US008428442B2

(12) United States Patent
Kendall

(10) Patent No.: US 8,428,442 B2
(45) Date of Patent: Apr. 23, 2013

(54) REMOTE CONTROL SYSTEM AND METHOD FOR PERSONAL VIDEO RECORDER

(75) Inventor: Scott Allan Kendall, Westfield, IN (US)

(73) Assignee: Thomson Licensing, Boulogne Billancourt (FR)

( * ) Notice: Subject to any disclaimer, the term of this patent is extended or adjusted under 35 U.S.C. 154(b) by 1257 days.

(21) Appl. No.: 10/510,055

(22) PCT Filed: Apr. 2, 2003

(86) PCT No.: PCT/US03/10018
§ 371 (c)(1),
(2), (4) Date: Oct. 4, 2004

(87) PCT Pub. No.: WO03/088238
PCT Pub. Date: Oct. 23, 2003

(65) Prior Publication Data
US 2005/0163477 A1      Jul. 28, 2005

Related U.S. Application Data

(60) Provisional application No. 60/370,439, filed on Apr. 5, 2002.

(51) Int. Cl.
*H04N 5/84* (2006.01)
*H04N 5/89* (2006.01)
(52) U.S. Cl.
USPC .......................................... 386/343; 386/344
(58) Field of Classification Search .................. 386/6–8, 386/68–70, 81–82, 234, 343–352
See application file for complete search history.

(56) References Cited

U.S. PATENT DOCUMENTS

| 4,939,601 | A | 7/1990 | Endo et al. |
| 5,134,497 | A | 7/1992 | Kim |
| 5,675,693 | A | 10/1997 | Kagoshima |
| 6,075,919 | A | 6/2000 | Omoto et al. |
| 6,360,053 | B1 * | 3/2002 | Wood et al. ..................... 386/67 |
| 6,847,778 | B1 * | 1/2005 | Vallone et al. ................. 386/68 |

FOREIGN PATENT DOCUMENTS

| JP | 6427060 A | 1/1989 |
| JP | 1-196759 | 8/1989 |
| JP | 6-101190 | 12/1994 |
| JP | 7-29355 | 1/1995 |

(Continued)

OTHER PUBLICATIONS

Search Report Dated Jul. 14, 2003.

*Primary Examiner* — Thai Tran
*Assistant Examiner* — Nigar Chowdhury
(74) *Attorney, Agent, or Firm* — Robert D. Shedd; Reitseng Lin

(57) ABSTRACT

A video playback apparatus receives a control signal from a remote control device having a multipurpose key and assigns alternative functions to the received signal depending on the duration of time the control signal is received. For example, the remote may have a combination skip-forward multipurpose key which when pressed for less than a predetermined period such as one second, causes the video playback apparatus to invoke its skip mode, and when pressed for more than the predetermined period causes the video playback apparatus to invoke its forward, fast forward, or super fast forward mode, depending on the duration of time the key is pressed beyond invocation of the forward mode.

21 Claims, 2 Drawing Sheets

FOREIGN PATENT DOCUMENTS

| | | |
|---|---|---|
| JP | 7-210976 | 8/1995 |
| JP | 8-195934 | 7/1996 |
| JP | 9-63145 | 3/1997 |
| JP | 1040608 A | 2/1998 |
| JP | 2000-11484 | 1/2000 |
| JP | 2000137500 A | 5/2000 |
| JP | 2000-243072 | 9/2000 |
| JP | 2001-309281 | 11/2001 |
| WO | 0062299 A1 | 10/2000 |

* cited by examiner

REMOTE CONTROL SYSTEM AND METHOD FOR PERSONAL VIDEO RECORDER

CROSS-REFERENCE TO RELATED APPLICATIONS

This application claims the benefit, under 35 U.S.C. §365 of International Application PCT/US03/10018, filed Apr. 2, 2003, which was published in accordance with PCT Article 21(2) on Oct. 23, 2003 in English and which claims the benefit of Provisional Patent Application No. 60/370,439, filed Apr. 5, 2002.

TECHNICAL FIELD OF INVENTION

This invention relates to the field of digital video playback apparatus such as PVRs (Personal Video Recorders), to remote control devices and associated features on video playback apparatus that are controlled by the remote control devices, and methods of controlling playback of recorded television programs.

BACKGROUND ART

The use of remote control devices to control recording and playback of video playback apparatus such as VCRs and PVRs is very well known. Remote control devices send control signals, usually infrared (IR), which are received and processed by associated video playback apparatus. For example, a user may press the "forward" button (hereinafter "key") on the remote control device, causing a coded signal to be transmitted and received by a PVR, and processed by software in a microprocessor (uP) in the PVR, resulting in the playback apparatus going into fast forward playback mode.

Prior remote control systems for digital video playback apparatus include separate keys for reverse, replay, forward, skip, and play, for example.

PVRs are sometimes combined with other functions such as cable receivers, VCRs, and satellite television, and systems for receiving Internet such as WebTV, resulting in more complicated remote control units ("remote controllers"). Future PVRs may be combined with other devices and functions such as DVD burners and televisions, which would require even more complicated remote controllers.

It has been a longstanding objective in the art of video playback apparatus to reduce the complexity of remotes.

DISCLOSURE OF INVENTION

This object, and others which will become apparent from the following disclosure and drawings, is addressed by the present invention which comprises in one aspect a digital video playback apparatus which responds to the duration of a control signal from a remote, and invokes a different function for long signals, which exceed a predetermined threshold in duration, versus short control signals, which do not exceed the predetermined threshold in duration.

Another aspect of the invention comprises a remote control device to be used with a video playback apparatus having a replay-reverse multipurpose key and a skip-forward multipurpose key.

A further aspect of the invention is a system comprising the video playback apparatus and the remote controller.

The video playback apparatus can be any which responds to remote control signals from a remote control device and processes the signals to invoke playback functions.

The preferred video playback apparatus is a PVR, which employs a memory such as a hard drive to store digital files of television programs. Such PVRs have been sold under the trademarks TiVo and ReplayTV, for example. PVR-type devices, which store digital files in any type of memory system, are very suitable. In fact, any type of digital device capable of normal video playback, skip, forward, reverse, and replay functions upon command of a remote controller can be used in the invention, as long as the device can be programmed to include the novel responses to multifunction keys provided by this invention.

The preferred remote control devices are one that has a multipurpose key labeled reverse and replay, and a multipurpose key labeled forward and skip. The reverse-replay multipurpose key is pressed for less than a predetermined duration, for example one second, to invoke a replay function to review a predetermined, preceding segment, for example the last seven seconds prior to the replay function being invoked. The reverse-replay multipurpose key is pressed for more than the predetermined duration, one second in this example, to invoke the reverse function, which causes the PVR to play backwards through the digital file from the point where the function is invoked, in a manner very familiar to users of PVRs. Prior art PVRs have reverse and replay functions, but separate keys on the remote control device were necessary for those two functions. Separate keys were also necessary in prior art remote controlled PVRs for skip, which forwards the play for a predetermined time such as 30 seconds, and forward, which fast forwards the play continuously.

A preferred embodiment of the invention uses the forward-skip multipurpose key on the remote to control the speed of the forward, either toggling between several, usually three, fast forward speeds by additional presses of that key after forward is invoked, or by the user holding down that forward-skip multipurpose key. For example, after 1 second, the reverse speed is −2×, after 2 seconds, the reverse speed is −4×, and after 3 seconds, the reverse speed is −8×, up to a maximum of −16× after 4 seconds.

In a preferred embodiment, the remote repeats code associated with a particular multipurpose key over and over with a wait, or time gap, of a predetermined amount, usually between about 1 and 10 ms., for example about 5 ms., between repetitions of the code. The decoder in the video playback apparatus interprets a gap of, say, 20 to 40 ms, wherein code is not received, to be a release of the multipurpose key and, if the "release" is interpreted as occurring at less than the predetermined amount, 1 second in this example, then the replay function of the replay-reverse key, or the skip function of the skip-forward key, is invoked.

A graphical user interface (GUI) is usually generated for display by any PVR-type device. The devices of the invention preferably generate a "skip" notice or icon when a control signal from a skip-forward key press is first received, and then a forward notice or icon is generated for the GUI display if the skip-forward signal is received for more than a predetermined time such as one second. Preferably, upon detection of additional presses of the skip-forward key when the playback is in a forward speed mode, the forward speed is incremented or toggled to the next higher speed. Preferred forward speeds are 2×, 4×, 8×, and 16×.

Preferably upon detection of one or more additional presses of the replay-reverse key when a reverse mode has been invoked, the reverse speed is incremented or toggled to the next higher reverse speed, for example from −2× to −4× to −8× to −16×, depending on the number of key presses.

In each case, the corresponding notices or icons for replay, skip, 2×, 4×, 8×, 16×, −2×, −4×, −8×, and −16× are preferably generated for the GUI when those modes are invoked.

MODES FOR CARRYING OUT THE INVENTION

Figure 1:
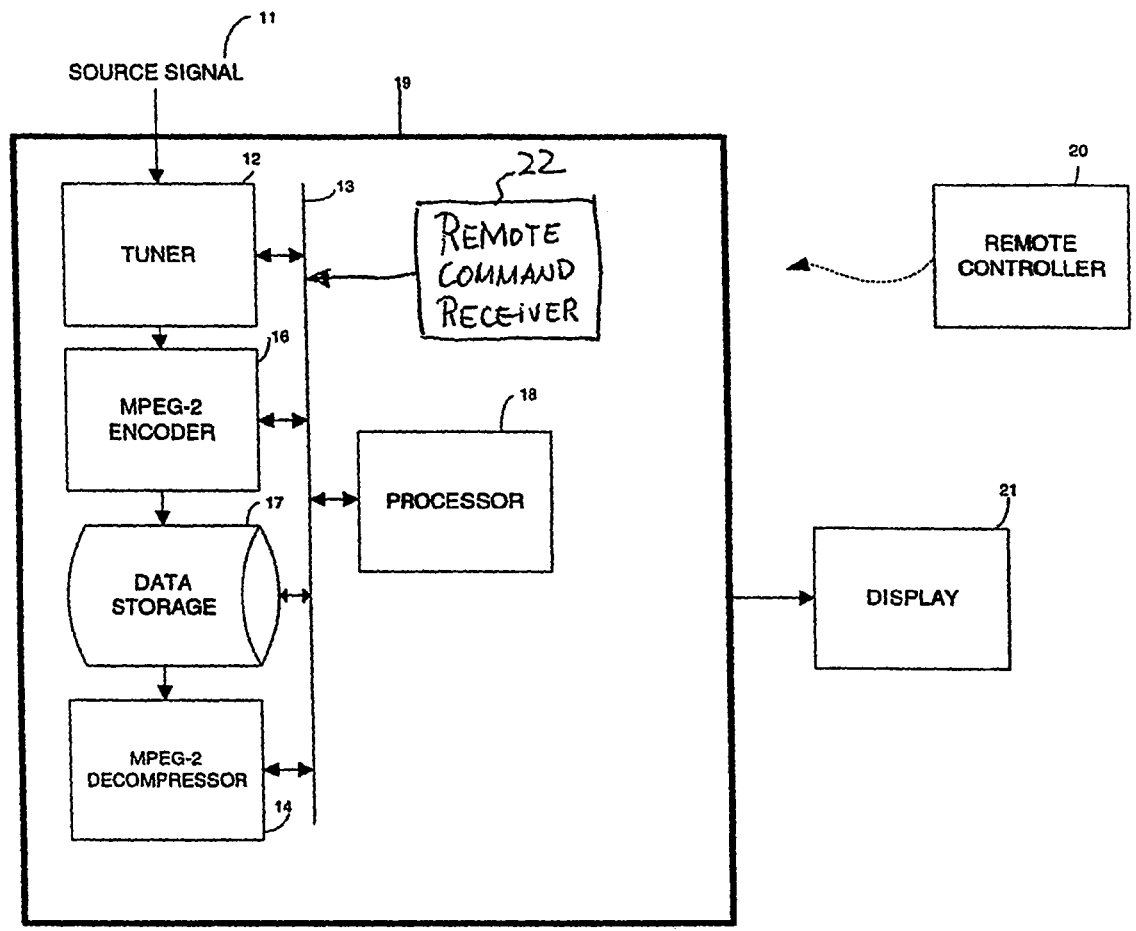
FIG. 1 is a block diagram of a personal video recorder apparatus according to the invention.

Referring first to FIG. 1, a personal video recorder (PVR) 19 receives a source signal 11 from, for example, a satellite receiver or a cable provider, and under control of processor 18 with tuner 12 tuned to receive the source signal 11, compresses it with MPEG-2 encoder 16, stores files in MPEG-2 format in a data storage 17 such as a hard disk memory device and, when needed for display, decompresses the stored files with MPEG-2 decompressor 14. Other compressed formats can be used, for example, MPEG-4 or DV. Other memory devices can be used such as RAM (random access memory). The PVR 19 also includes a remote command receiver 22 for receiving user commands from a remote controller 20. The remote controller 20 may have an IR or RF transmitter for transmitting code signals representing user commands. As an alternative, user commands can be generated by using input devices such as buttons (not shown) attached to the PVR 19. All of the components are linked via bus 13 and controlled by processor 18.

The PVR 19 may include other functionalities such as providing a connection to the Internet through DSL, providing WinTV functionalities, and providing functionalities as a personal computer.

A stored television program, for example one that has been recorded at a user's request using the remote controller 20 and user interfaces generated by processor 18 and other components of the PVR on display 21, is played back at user command via the remote controller 20 on the display 21. The display can be any suitable viewing device such as a standard television or video monitor.

The PVR 19 can be of any design, including the types known by their trademarks TiVO and ReplayTV, and are sometimes known as digital video recorders. PVRs and other types of digital video playback apparatus are well known alternatives to VCRs for the function of time shifting of television programs. Digital playback apparatus are advantageous in several regards, including not needing blank recording tape, using electronic program guides to assist in selection of programs to be recorded, and varying speeds and types of playback modes, including "skip" which forwards the point of playback by, typically, 30 seconds, and "review" or "replay," which causes the PVR to play back at normal speed the last several seconds, typically 7 seconds, of play from the point at which replay is invoked. Each of these functions is typically carried out in response to commands from a remote controller.

Figure 2:
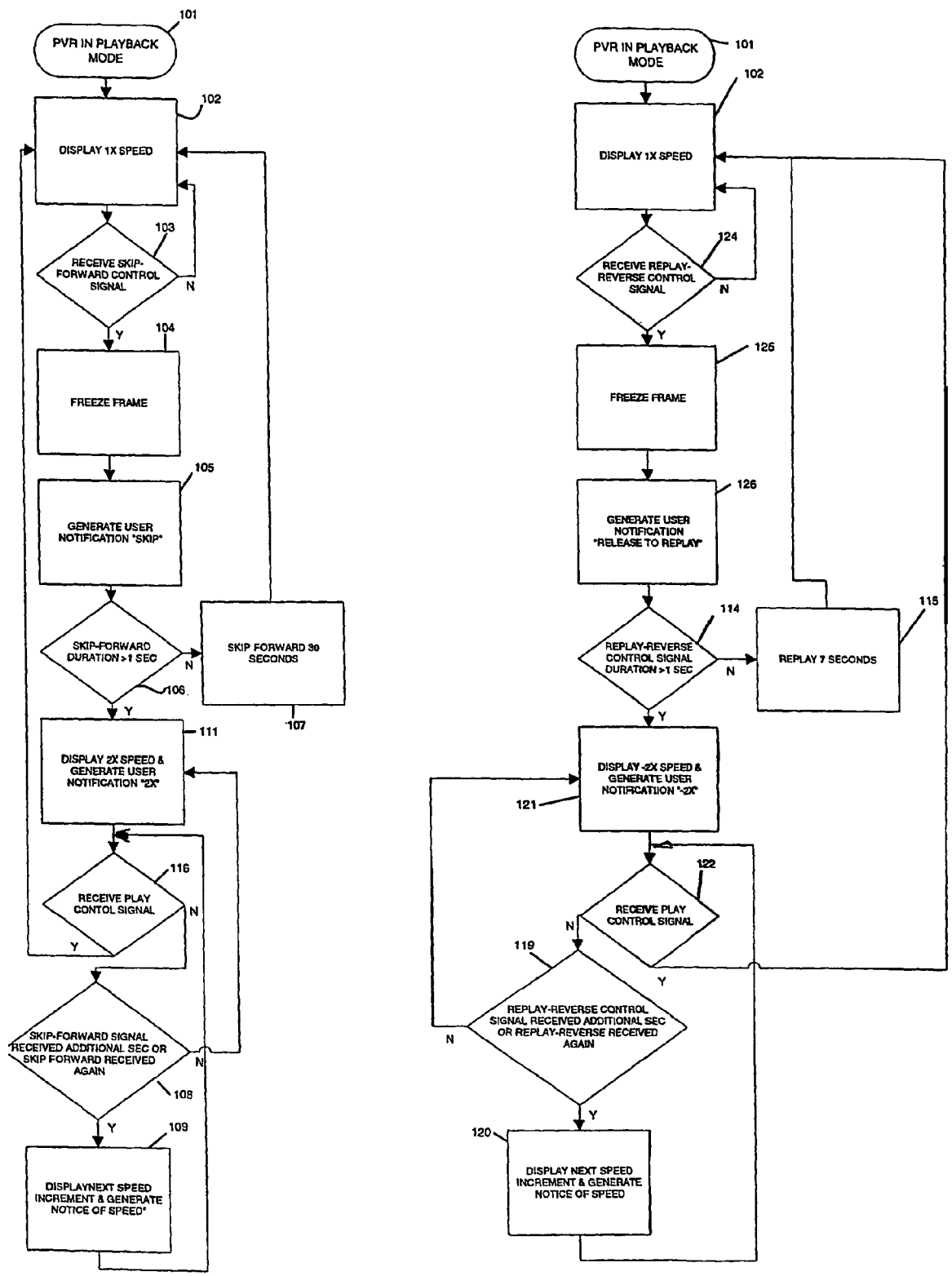
FIG. 2 is a flow chart showing an embodiment of a process according to the invention.

Referring now to FIG. 2, a process is shown starting at 101 with the PVR in playback mode, i.e., displaying at 102 a program at normal viewing speed, known in the art as 1× speed. Upon receipt of a "skip-forward" control signal as determined at decision block 103, which is generated by pressing the corresponding key on a remote controller 20 (FIG. 1), the processor causes the PVR to generate a freeze frame at 104, wherein the playback is "paused" at the point where the "skip-forward" control signal is received, and a user notification is generated and displayed saying "skip" at 105.

If the duration of the "skip-forward" control signal received by the PVR does not exceed one second as determined at decision block 106, the processor 18 causes the PVR to "skip" forward 30 seconds at 107 by processing the uncompressed file so as to cause a virtual skipping of video being streamed to the display. As used herein, an on-off signal is considered one continuous signal as long as the gap (the off time) is no more than a first predetermined threshold, preferably, between about 1 millisecond and 10 milliseconds. If the gap is more than a second predetermined threshold, the signals before and after the gap are not considered a part of a continuous signal; they are considered two signals. The second predetermined threshold is equal to or larger than the first, and preferably is set at 20 milliseconds. A continuous signal is normally generated by holding down a key on the remote controller 20. Two signals are generated when a user presses a key, release the key, and presses the key again.

If the "skip-forward" control signal is received for more than 1 second as determined at 106, the stored television program file is streamed at a first forward speed, i.e., 2×, and a user notification of "2×" is displayed on the display 21 at 111. The 2× mode continues until either a play control signal at 116 is received, causing the mode to be switched by the processor 18 to normal playback speed 1× at 102, or another "skip-forward" control signal is received as determined at decision block 108, causing the forward speed to increment at 109 to the next higher forward speed, 4× in this example. For each additional skip-forward control signal received as determined at decision block 108 while the system is in any forward speed, the mode switches at 109 to the next higher forward speed increment and a notice of the new speed mode is generated.

The next higher forward speed is also invoked when the "skip-forward" control signal is detected greater than a second predetermined threshold, 2 seconds in this example as determined at decision block 108, causing the display mode to be switched to 4× and a user notification of "4×". In this exemplary embodiment, for each additional second the "skip-forward" control signal persists, the PVR switches to the next higher forward speed until the highest available speed has been reached. Although the duration for moving to the next higher speed is illustrated as a constant of one second, the duration for moving to next speed may vary. For example, the duration for moving from 2× to 4× may be 0.5 second but the duration for moving from 4× to 8× may be at 0.25 second. Thus, the duration becomes shorter for advancing to a higher speed. The increase of the speed may be in any functional relationship with the duration. For example, after holding down the "skip-forward" key over a second, the PVR switches into fast forward mode and the forward speed is directly proportional to the duration of the "skip-forward" signal until the PVR reaches its highest possible speed.

The process where a "replay-reverse" control signal is received is very similar. Again, starting with the PVR in playback mode at 101, the display is in 1× mode at 102. When a "replay-reverse" control signal is received as determined at decision step 124, the frame is frozen, i.e., paused at 125, and a user notification such as "release to replay" or "replay" is generated at 126. If the "replay-reverse" control signal is received for a duration less than one second as determined at decision block 114, the video is virtually reversed for 7 seconds so that the last 7 seconds previously viewed is replayed at 15. If the "replay-reverse" control signal is received for duration of greater than 1 second as determined at the decision block 114, the program is displayed in reverse mode at a speed of −2× at 121. If the "replay-reverse" control signal is received for greater than 2 seconds as determined at decision block 119, or if a second "replay-reverse" control signal is received, the program is displayed in −4× speed. For each additional second, the "release-reverse" signal persists, or for each additional replay-reverse control signal received as determined at decision block 119 while the system is in −2×, −4×, −8×, −16× or any other reverse speed, the mode switches at 120 to the next speed increment and a notice of the new speed mode is generated at 120. When the highest available speed has been reached, the persistence of the "release-reverse" signal will not change the speed of the PVR.

If a play control signal is received as determined at decision block 122 while the system is in a reverse mode, playback reverts to the normal speed at 102.

The principles of the invention can be applied to other keys as well such as the play key. For example, when the play key is pressed for less than a predetermined time (for example, one second), the PVR plays a video at a normal speed 1×. When the play key is pressed for more than one second, the PVR switches into a fast-forward mode having a speed of 2×. For each additional second, the play key is pressed, the PVR switches into next higher forward speed until the highest available speed has been reached.

The principles of the invention can also be applied to other digital and analog playback apparatus such as a DVD player or a VCR, in which the above three keys or their equivalents are provided in the playback apparatus or in its remote controller.

While this invention has been described with regard to a few presently preferred embodiments, those skilled in this art will readily appreciate that many alternative modes and embodiments can be carried out without departing from the spirit and scope of this invention.

The invention claimed is:

1. A video playback apparatus having means to invoke a replay function and a reverse function separately upon receipt of a first signal, wherein said replay function is activated in response to said first signal exhibiting a first duration of time and wherein said reverse function is activated in response to said first signal exhibiting a second duration of time different from said first duration, and means to invoke a skip function and a forward function separately upon receipt of a second signal different from the first signal, wherein said skip function is activated in response to said second signal exhibiting a third duration of time and wherein said forward function is activated in response to said second signal exhibiting a fourth duration of time different from said third duration.

2. The video playback apparatus of claim 1 wherein the replay function is invoked upon receipt of the first signal exhibiting said duration of time below a first replay-reverse predetermined threshold, and the reverse function with a first reverse speed is invoked upon receipt of the first signal exhibiting said duration of time above the first replay-reverse predetermined threshold, and wherein the skip function is invoked upon receipt of the second signal exhibiting said duration of time below a first skip-forward predetermined threshold and a first forward function with a first forward speed is invoked upon receipt of the second signal exhibiting said duration of time above the first skip-forward predetermined threshold.

3. The video playback apparatus of claim 2 wherein the first skip-forward predetermined threshold is one second and the first replay-reverse predetermined threshold is one second.

4. The video playback apparatus of claim 3 wherein the reverse function has the first reverse speed and a second reverse speed faster than the first reverse speed, and upon receipt of the first signal exhibiting said duration of time greater than the first replay-reverse predetermined threshold, the first reverse speed is invoked, and upon receipt of the first signal exhibiting said duration greater than a second replay-reverse predetermined threshold, the second reverse speed is invoked.

5. The video playback apparatus of claim 3 wherein the forward function has the first forward speed and a second forward speed faster than the first forward speed, and upon receipt of the first occurrence of the second signal exhibiting said duration of time greater than the first skip-forward predetermined threshold, the first forward speed is invoked, and upon receipt of the second signal exhibiting said duration greater than a second skip-forward predetermined threshold greater than the first skip-forward predetermined threshold, the second forward speed is invoked.

6. The video playback apparatus of claim 5 wherein upon receipt of the second signal exhibiting said duration greater than a next greater skip-forward predetermined threshold, the next faster forward speed is invoked, up to the highest available forward speed.

7. The video playback apparatus of claim 5 wherein the second forward predetermined threshold is at least one second greater than the first forward predetermined threshold.

8. The video playback apparatus of claim 4 wherein upon receipt of the first signal exhibiting said duration greater than a next greater replay-reverse predetermined threshold, the next faster reverse speed is invoked, up to the highest available reverse speed.

9. The video playback apparatus of claim 4 wherein the second replay-reverse predetermined threshold is at least one second greater than the first replay-reverse predetermined threshold.

10. The video playback apparatus of claim 1 having 2×, 4×, 8×, and 16× forward speeds and −2×, −4×, −8×, and −16× reverse speeds.

11. The video playback apparatus of claim 1 wherein duration of a remote control signal selected from the first signal and the second signal is calculated based on number of repetitions of code signal included in the remote control signal received, each repetition separated by a predetermined gap.

12. The video playback apparatus of claim 11 wherein the predetermined gap is between 1 and 10 milliseconds.

13. The video playback apparatus of claim 11 wherein an end of a remote control signal is calculated upon a gap between repetitions of receipt of a code signal of greater than 20 milliseconds in the remote control signal.

14. The video playback apparatus of claim 1 having one or more functionalities in addition to video playback, the functionalities selected from DSL, integrated receiver-decoder, WinTV, and personal computer.

15. A remote control device for use with a video playback apparatus of claim 1 having a replay-reverse multipurpose key and a skip-forward multipurpose key for generating the first signal and the second signal, respectively, when activated.

16. The remote control device of claim 15 having means to send the first signal when the replay-reverse multipurpose key is pressed and the second signal when the skip-forward multipurpose key is pressed.

17. The remote control device of claim 15 having means to send repetitions of the first signal when the replay-reverse multipurpose key is activated and to send repetitions of the second signal when the skip-forward multipurpose key is activated, each repetition separated by a predetermined gap.

18. The remote control device of claim 17 wherein the predetermined gap is between 1 and 10 milliseconds.

19. The remote control device of claim 17 wherein the predetermined gap is about 2 milliseconds.

20. A system comprising a video playback apparatus according to claim 1 and a remote control device having a replay-reverse multipurpose key for generating the first signal and a skip-forward multipurpose key for generating the second signal.

21. A method of controlling operation of a digital video playback apparatus, the method comprising the steps of:

> invoking a skip function upon receipt of a second signal exhibiting less than a first predetermined duration, invoking a forward function exhibiting a first forward speed upon receipt of the second signal exhibiting greater than the first predetermined duration, invoking the forward function exhibiting a second, faster forward speed upon receipt of either the second signal exhibiting greater than a second predetermined duration or upon receipt of a second occurrence of the second signal; and
>
> invoking a replay function upon receipt of a first signal exhibiting less than a first predetermined duration, invoking a reverse function exhibiting a first reverse speed upon receipt of the first signal exhibiting greater than the first predetermined duration, invoking the reverse function exhibiting a second, faster reverse speed upon receipt of either the first signal exhibiting greater than a second predetermined duration or upon receipt of a second occurrence of the first signal.

* * * * *